No. 896,706. PATENTED AUG. 25, 1908.
C. BRENT.
FLUID LEVEL INDICATOR.
APPLICATION FILED JAN. 2, 1907.
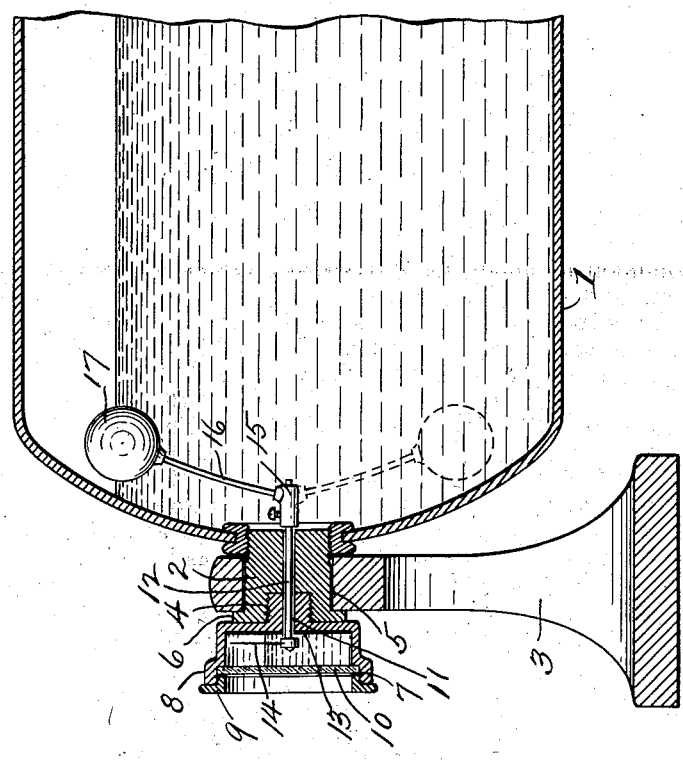
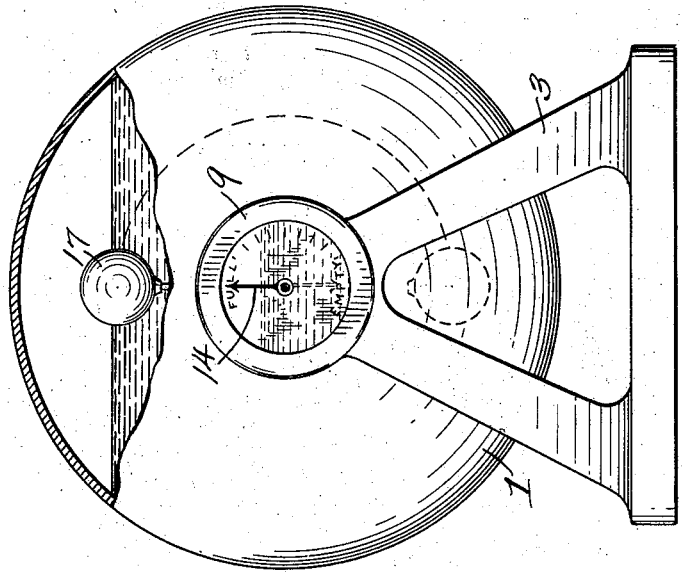
Witnesses:
A. L. Lord.
C. G. Heylmun
Inventor.
Charles Brent,
by Bluford W. Brockett
Attorney.

UNITED STATES PATENT OFFICE.

CHARLES BRENT, OF BRANDON, MANITOBA, CANADA.

FLUID-LEVEL INDICATOR.

No. 896,706.  Specification of Letters Patent.  Patented Aug. 25, 1908.

Application filed January 2, 1907. Serial No. 350,357.

*To all whom it may concern:*

Be it known that I, CHARLES BRENT, residing at Brandon, in the Province of Manitoba and Dominion of Canada, have invented a certain new and useful Improvement in Fluid-Level Indicators, of which the following is a full, clear, and exact description, reference being had to the accompanying drawings.

This invention relates to improvements in fluid level indicators and is especially adapted for use in connection with the fluid tank of a fire extinguisher to show the amount of liquid which has been used and the amount yet remaining for use at another time.

More specifically the invention relates to a float which is mounted inside of the fluid tank and is connected to a shaft extending outside of the tank into a casing having a transparent face where it is provided with a suitable indicator, which moves with the float and thereby indicates the height of the fluid in the tank and shows the amount of fluid remaining in the same.

The invention may be further briefly summarized as consisting in the construction and combination of parts hereinafter set forth in the following description, drawings and claims.

Referring to the drawings Figure 1 is an end elevation of a tank provided with my device, and Fig. 2 is a vertical section of the same.

I have shown one embodiment of my invention in the drawing wherein the tank 1, is provided with a suitable trunnion 2, which is mounted in a bearing carried by a bracket 3. This trunnion 2 is preferably provided with a threaded opening 4 and with another opening 5 leading to the inside of the tank. A plug 6 is secured in the opening 4 and is provided with a casing 8 carrying a ring 9 engaging a packing ring 7 for securing a glass plate 10 in place and with an opening 11 for the passage of a shaft 12, which extends from the chamber in the casing 8 within the tank 1. The opening in the trunnion 2 and in the plug 6 is larger in each instance than the shaft 12 which goes through them whereby liquid may pass into the casing 8. The casing 8 is provided upon its back with a dial 13, which may be provided with graduations and legends showing the several conditions within the tank. The shaft 12 is provided with an index member 14, which travels about the dial 13 and on the opposite end, inside of the tank 1, with a boss 15 having secured therein a rod 16 at the end of which is a hollow float 17. This rod 16, carrying the float and the index member 14 are arranged upon the shaft 12 in a manner such that they will coöperate with each other and move together, that is, as the float moves down with the liquid as it is discharged from the tank 1, the index member 14 likewise moves down over the graduations and legends of the dial 13 and indicates the level of the liquid or fluid in the tank.

Having described my invention, I claim:

1. In combination, a fluid tank, a trunnion carried thereby, a shaft extending through said trunnion, a casing carried by said trunnion, and in open communication with said tank, said casing having a sight opening, a dial within said casing, a shaft extending through said trunnion, an index member carried by said shaft within said casing and a float mounted upon the inner end of said shaft and adapted to operate said index member.

2. In a fluid level indicator, in combination, a fluid tank, an indicator casing having a glass front and secured to said tank and also having an opening which establishes communication between the two, a shaft extending from the tank into said casing through said opening, a float mounted upon said shaft within said tank and an index member within said casing and operated by said shaft for indicating the amount of fluid within said tank.

In testimony whereof I affix my signature in the presence of two witnesses.

CHARLES BRENT.

Witnesses:
 GEORGE H. DRAPER,
 MICHAEL J. GALVIN.